Nov. 6, 1945.   E. E. HEWITT   2,388,357
CONTROL APPARATUS
Filed Jan. 29, 1943

INVENTOR
*Ellis E. Hewitt*
BY
ATTORNEY

Patented Nov. 6, 1945

2,388,357

UNITED STATES PATENT OFFICE 2,388,357

CONTROL APPARATUS

Ellis E. Hewitt, Edgewood, Pa., assignor to The Westinghouse Air Brake Company, Wilmerding, Pa., a corporation of Pennsylvania Application January 29, 1943, Serial No. 473,922

32 Claims. (Cl. 192—.01)

This invention relates to control apparatus and more particularly to manually controlled power means for controlling the operation of devices such as clutches, or fuel supply devices for governing the speed or power output of internal combustion engines.

In the pending application of Roy R. Stevens, Serial No. 448,167, filed June 23, 1942, and assigned to the assignee of the present application, there is disclosed an apparatus embodying a fluid motor for controlling a clutch to either connect or disconnect an engine to or from a device to be driven, such as a propellor of a water craft. The clutch is of the reversing type embodying a control member having three positions, namely, a forward position for causing the engine to drive the device in one direction, a reverse position for causing the engine to drive the device in a reverse direction and a neutral position, intermediate forward and reverse positions, for disconnecting the device from the engine. The apparatus also embodies a fuel governing motor adjustable by fluid pressure to vary the fuel supply to the engine and thereby the speed or power output of the engine in accordance with the pressure of such fluid.

The apparatus further embodies a control device for controlling the clutch and fuel governing motors. This control device has a manually operable lever which is movable in one plane to a forward position, a reverse position and to an intermediate or neutral position for causing corresponding positioning of the clutch control member. In this one plane of movement the fuel governing motor is adjusted to provide for operation of the engine at a chosen reduced or idling speed. To accelerate the engine the lever, after movement to the forward position or to the reverse position to effect engagement of the clutch, must be moved into another plane and the degree of acceleration may be adjusted according to the extent of such movement.

When a water craft is moving either forwardly or astern with the engine operating at some speed above idling, there are times when an operator might desire to suddenly reverse the direction of movement of the craft. To accomplish this with the apparatus above described, the operator might move the control lever from full speed forward directly to the full speed reverse. As the lever would thus be moved into the clutch control plane the fuel supply governing motor would be operated to provide for reducing of the engine speed to idling, but if the movement from full speed forward to full speed reverse were sufficiently rapid, inertia of the moving parts in the engine and clutch might prevent the engine speed reducing as desired before the clutch were engaged to cause reverse movement of the craft. As a result, severe and possibly damaging shocks might occur in the clutch, engine and parts driven by the engine.

One object of the invention is therefore the provision of means for preventing reversal of the clutch device condition as by preventing movement of the manually operative control lever from forward position to reverse position, or vice versa, with the engine operating at a speed above idling or some other chosen low degree.

Another object of the invention is the provision of an arrangement for preventing reversal of the clutch drive condition as by preventing movement of the clutch control lever from forward position to reverse position, or vice versa, until the speed of the engine is reduced to a chosen low degree, and to then prevent acceleration of the engine until after the clutch has been substantially engaged.

Another object of the invention is the provision of an improved manually operative control device for accomplishing the above objects.

Other objects and advantages will be apparent from the following more detailed description of the invention.

In the accompanying drawing.

Description

In the drawing, the reference numeral 1 indicates a portion of a clutch housing containing a three position reversing clutch such as above described. A rock shaft 2 is journaled in said housing for controlling the clutch and is operable by a lever 3 having "forward" and "astern" clutch engaging positions and an intermediate or "neutral" clutch disengaging position for correspondingly condition the clutch. These positions are indicated by dot and dash lines and appropriate legends in Fig. 1.

Figures 1, 2, 3:
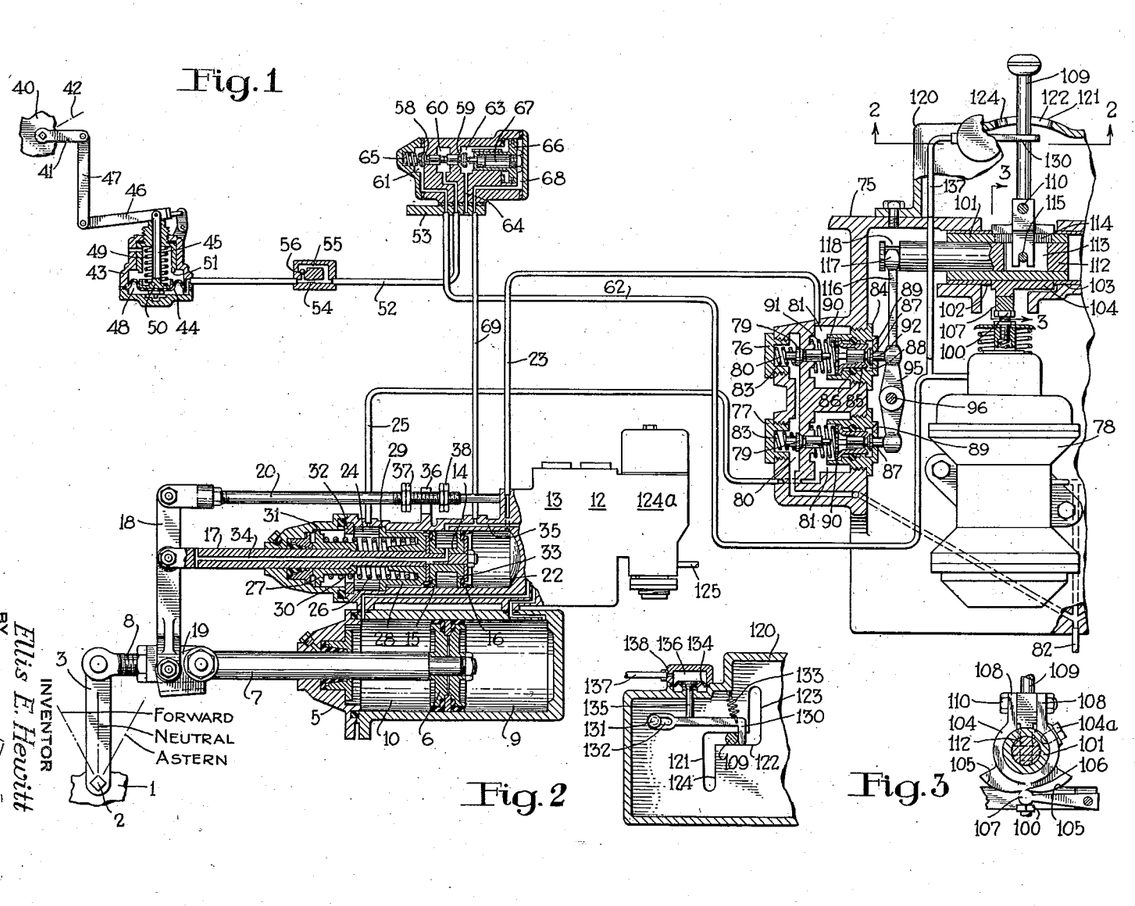
Fig. 1 is a diagrammatic view, partly in section and partly in outline, of a control apparatus embodying the invention.
Figs. 2 and 3 are sectional views taken on the lines 2—2 and 3—3 in Fig. 1.

The reference numeral 5 indicates a fluid motor which is selectively operative to move the arm 3 to any one of its three different positions for correspondingly conditioning the clutch. Functionally, this motor may be identical to the corresponding motor disclosed in the aforementioned pending Stevens application, and accordingly only such parts have been shown in the drawing as are deemed necessary to a clear understanding of the invention.

The fluid motor 5, which will now be briefly described, comprises a casing containing a power piston 6 which is operatively connected by a piston rod 7 and a link 8 to the end of the clutch control arm 3. The piston 6 has at one side a pressure chamber 9 and at the opposite side a pressure chamber 10. When fluid pressure is supplied to chamber 9, as will be later described, such pressure acting on piston 6 will move same in the direction of the left hand for moving the clutch control arm 3 from "neutral" position toward "forward" position or from "astern" position to either "neutral" position or "forward" position, in accordance with the desired positioning of the clutch. When fluid pressure is supplied to chamber 10 such pressure will act on piston 6 to move the clutch control lever 3 in the direction of the right hand from "neutral" position toward the "astern" position, or from the "forward" position toward either "neutral" or the "astern" position in accordance with the desired positioning of the clutch.

The pressure of fluid acting on opposite sides of the power piston 6 is controlled by a control valve device comprising a forward valve device 12 and a reverse valve device 13 which in turn are arranged to be controlled by the cooperative action of a pilot piston 14 and the power piston 6.

The pilot piston 14 comprises two spaced piston heads, 15 and 16, connected to one end of a piston rod 17 which extends to the exterior of the casing. The outer end of the piston rod 17 is operatively connected to a lever 18 at a point located intermediate the ends of the lever. One end of the lever 18 is operatively connected to the power piston rod 7 through the medium of a link 19 while the opposite end is connected to one end of a reach rod 20 which has connections (not shown) with the forward and release valve devices 12 and 13.

The pilot piston 14 has at one side a pressure chamber 22 open to a control pipe 23, and has at the opposite side a pressure chamber 24 open to a control pipe 25. Two spring stops 27 and 28 are slidably mounted on the piston rod 17 in chamber 24, and encircling said rod and bearing at opposite ends on said stops is a neutralizing spring 26 which is under initial compression. The stop 28 engages the piston head 15 and has an outturned collar 29 arranged to cooperate with a shoulder in a casing to limit movement of said stop toward the right hand. The stop 27 has an inturned collar 30 at one end for engaging a shoulder on piston rod 17 so as to move said stop with the pilot piston upon movement of said piston toward the right hand. The stop 27 also has an outturned collar 31 for engaging a shoulder in a casing to limit movement of said stop toward the left hand. With the collars 29 and 31 on the two stops engaging the shoulders in the casing under the pressure of spring 26, the interengagement of stop 27 with piston rod 17 and of stop 28 with the pilot piston positions said piston in its neutral position shown in the drawing.

The pilot piston 14 is arranged to be moved in either one direction or the opposite direction out of neutral position by fluid under pressure supplied through either pipe 23 or pipe 25 with the other pipe vented, by means which will be later described. Fluid under pressure supplied through pipe 23 to chamber 22 will move the pilot piston 14 and stop 28 against spring 26 until such stop engages a stop ring 32 in the casing which defines a forward position of said piston. Fluid under pressure supplied through pipe 25 to chamber 24 will move the pilot piston and stop 27 against spring 26 until such stop engages the stop ring 32 which defines a reverse position of the piston. Upon release of fluid under pressure from either pipe 23 or 25 with the other pipe vented, spring 26 will return the pilot piston to its neutral position.

Intermediate the two piston heads 15 and 16 of the pilot piston is a chamber 33 which is in constant communication with the atmosphere through a passage 34 in the piston rod 17. A passage 35 in the casing is open to chamber 33 midway between the two piston heads 15 and 16 when the pilot piston 14 is in its neutral position as shown. When the pilot piston is in its forward position passage 35 is opened to chamber 22. In the reverse position of the pilot piston passage 35 is open to chamber 24.

The rod 20 extends through a jaw 36 projecting upwardly from the casing. At one side of jaw 36, rod 20 is provided with an adjustable stop 37 and on the other side with another adjustable stop 38, said stops being provided for engagement with said jaw to limit movement of said rod and thereby of the pilot piston 14 relative to the power piston 6 to a degree just sufficient to actuate valve device 13 or 12 to supply fluid under pressure to the power piston chambers 10 or 9, respectively.

The reference numeral 40 indicates a portion of a fuel supply device for governing the amount of fuel supplied to the engine to which the clutch controlled by clutch arm 3 is connected. This device may have an adjusting arm 41 for governing the amount of fuel supplied to the engine, and said arm may have an engine idling position, such as shown in the drawing, for limiting the fuel supply to the engine to a degree which will provide for idling operation thereof. The arm 41 may be moved from this idling position for increasing the supply fuel to the engine and to a position indicated by a dot and dash line 42 which will provide for the maximum fuel supply to the engine and thereby operation of the engine at maximum speed or power output.

A power motor 43 is provided for adjusting the position of arm 41. The motor comprises a casing containing a movable abutment preferably in the form of a flexible diaphragm 44 which is connected through a follower 50 provided on the end of rod 45, a lever 46, and a link 47 to the arm 41. The diaphragm 44 has at one side a fluid pressure chamber 48 while at the opposite side is a coil spring 49 circling the rod 45 and acting on the diaphragm in opposition to pressure of fluid in chamber 48. With the chamber 48 open to the atmosphere the spring 49 will maintain the diaphragm 44 in the position in which it is shown in the drawing for thereby holding the arm 41 of the fuel supply device in its engine idling position. When fluid under pressure is supplied to pressure chamber 48 to a degree sufficient to overcome the opposing force of spring 49, the diaphragm 44 will be deflected upwardly and thereby move the adjusting arm 41 out of its engine idling position in the direction of the full speed position indicated by the numeral 42. The full speed position will be obtained when the pressure of fluid in chamber 48 is increased to a sufficient degree to move the follower into engagement with a stop 51 in the casing which defines said position. It will be readily seen that the arm 41 may be adjusted to any position between idling position and full speed position by providing the proper pressure of fluid in chamber 48 to act on the diaphragm 44.

The pressure chamber 48 in the power motor 43 is connected through a pipe 52 to an interlock valve device 53. A choke 54 is provided to restrict flow of fluid through pipe 52 in the direction of motor 43. A passage 55 by-passing the choke 54 is provided to allow an unrestricted rate of flow of fluid under pressure from diaphragm chamber 48 in the direction of the interlock valve device and in this passage is a check valve 56 for rendering the choke effective upon flow of fluid under pressure in the opposite direction through said pipe.

The interlock valve device 53 comprises two coaxially arranged poppet valves 58 and 59 which are oppositely arranged and have fluted stems engaging each other in a chamber 60 to which the pipe 52 is open. The valve 58 is contained in a chamber 61 which is open to a pipe 62, while the valve 59 is contained in a chamber 63 which is open through a passage 64 to the atmosphere. A spring 65 in chamber 61 acts on valve 58 for seating same and at the same time unseating the valve 59.

The interlock valve device further comprises a piston 66 having a stem 67 for engaging the valve 59. One side of the piston 66 is open to the atmosphere through chamber 63 and passage 64 while at the opposite side of said piston is a chamber 68 which is connected by a pipe 69 to passage 35 in the clutch motor 5. With the pilot piston 14 of the clutch motor in its neutral position opening passage 35 to the atmosphere, chamber 68 in the interlock valve device will be likewise opened to the atmosphere so that poppet valve 58 will be seated and poppet valve 59 unseated by spring 65, thereby opening pipe 52 and chamber 58 in the fuel supply motor to the atmosphere to provide for operation of the power motor 43 to hold the adjusting arm 41 of the fuel governing device 43 in its engine idling position. When the pilot piston 14 is in its extreme left-hand position opening passage 35 to chamber 22 or in its extreme right hand position opening said passage to chamber 24, fluid under pressure acting in either of said chambers will flow to said passage and thence through pipe 69 to chamber 68 in the interlock valve device. This fluid in chamber 68 will actuate the piston 66 to seat the poppet valve 59 and open the poppet valve 58 to thereby connect pipe 52 to pipe 62 to provide for control of the motor 43 and thereby adjustment of the fuel supply arm 41 in accordance with pressure fluid acting in pipe 62.

The supply and release of fluid under pressure to pipes 23 and 25 leading to the clutch motor 5, and to pipe 62 leading to the interlock valve device 53 is arranged to be controlled by a manually operative control device indicated generally by the reference numeral 75, and which will now be described.

The manually operative control device 75 comprises a casing or body portion containing two selector valve devices 76 and 77 for controlling the supply and release of fluid under pressure to and from the pipes 23 and 25 respectively, and a self-lapping valve device 78 for controlling the supply and release of fluid under pressure to and from the pipe 62.

The two selector valve devices, which are identical in structure, are arranged side by side in slightly spaced apart relation and each comprises a fluid pressure supply valve 79 contained in a chamber 80 and arranged to control communication between said chamber and a chamber 81. In the selector valve device 76 the chamber 81 is connected to pipe 23, while in the selector valve device 77 said chamber is connected to pipe 25. Both chambers 80 are constantly supplied with fluid under pressure from any suitable source through a supply pipe 82 and each contains a spring 83 acting on the respective supply valve for seating same.

In each of the selector valve devices one wall of chamber 81 is formed by a closure cap 84 in which is slidably mounted a sleeve 85, a suitable packing 86 being interposed between said cap and sleeve to prevent leakage of fluid under pressure from chamber 81. A release valve 87 contained in a chamber 88 at one end of the sleeve 85 is arranged to seat against said end of said sleeve and has a fluted stem extending through a suitable bore in the sleeve into chamber 81, said sleeve and valve being arranged in coaxial relation with the respective supply valve 79.

The release valve 87 in each of the selector valve devices is provided to control communication between chamber 81 and chamber 88 which is open to the atmosphere through a port 89. A perforated follower 90 is slidably mounted in the inner end of each closure member 84 for engaging the adjacent end of sleeve 85 and the end of the release valve stem, and a spring 91 in chamber 81 acts on said follower for unseating the release valve and for moving the follower and sleeve 85 to the position in which they are shown and which may be defined by engagement between said sleeve and the respective cap 84. In this position of sleeve 85, the release valve 87 is unseated as just mentioned and the supply valve 79 is seated and the space between the stems of the two valves equals substantially the distance the release valve 87 is unseated from the sleeve 85. Movement of a stem 92 projecting from the release valve 87 inwardly of cap 84 will move the release valve 87 into engagement with the end of sleeve 85 and at the same time move the follower 90 against the spring 91 into substantial engagement with the stem of the supply valve 79. After the release valve is thus seated further inward movement of stem 92 will then move the sleeve 85 with the release valve and act through the follower 90 to unseat the supply valve 79 to thereby supply fluid from chamber 80 to chamber 81. Upon release of force on the stem 92 spring 91 will return the sleeve 85 and release valve 87 to the positions in which they are shown in the drawing and during such movement first allow closing of the supply valve 79 by spring 83 and then the opening of the release valve 87 for releasing fluid under pressure from the chamber 81.

The two plungers or stems 92 in the selector valve devices 76 and 77 are engaged by opposite end portions of a lever 95 which is mounted on a fulcrum pin 96 disposed intermediate said stems. Rocking of the lever 95 in one direction will therefore actuate one selector valve device to supply fluid under pressure to its chamber 81 while allowing the other selector valve device to maintain its chamber 81 open to the atmosphere. On the other hand rocking of lever 95 in the opposite direction will reverse the operation of the two selector valve devices. It will thus be seen that when fluid under pressure is supplied to either one of the pipes 23 or 25 by operation of the respective selector valve device 76 or 78, the other of said pipes will be open to atmosphere.

The self-lapping valve device 78 may be of any suitable structure embodying a control member or plunger 100 operative upon downward movement from a normal position such as shown in the drawing to supply fluid to a pipe, such as the pipe 62, at a pressure dependent upon the extent of such movement and to open said pipe to atmosphere in said normal position.

A rock shaft 101 disposed above the plunger 100 is journaled in the casing in two spaced bearings, 102 and 103. A cam element 104 is secured on the shaft between its two bearings by means of a set screw 104a, said element substantially engaging the adjacent ends of the two bearings for holding the rock shaft 100 against longitudinal movement. At the side adjacent the control member 100 the cam element 104 has two like and oppositely arranged cam surfaces 105 joined by a recess 106 provided to receive one side of a power transmitting member 107 the opposite side of which is in contact with the control member or plunger 100. With the cam element positioned for recess 106 to receive the member 107 the control member 100 in the self-lapping valve device 78 is arranged to occupy its normal position to provide for opening of pipe 62 to the atmosphere. Rotation of the rock shaft 101 and thereby of the cam element 104 in either direction from this normal position is arranged to move the member 107 and thereby the control member 100 in a downward direction for supplying fluid to pipe 62 at a pressure proportional to the extent of such movement.

Opposite the cam recess 106, the cam element 104 has two spaced parallel arms 108 between which extends one end of an operator's control lever 109. A bolt 110 extends through the two arms 108 and the lever 109, thereby providing for rocking movement of the lever 109 in the cam element lengthwise of the rock shaft 101. Movement of the lever 109 circumferentially of the rock shaft will actuate the cam element 104 for controlling the self-lapping valve device 78, as will be apparent.

The rock shaft 101 is provided with an axial bore in which is slidably mounted a plunger 112 having a slot 113 aligned with a relatively long slot 114 through one side of said shaft. The inner end of the operator's lever 109 extends through the slot 114 and into slot 113 and within the shaft is connected to the plunger 112 by means of a pin 115 secured to said plunger. Rocking of the lever 109 in either direction from a neutral position shown, lengthwise of the rock shaft 101 will thus move the plunger 112 lengthwise.

The selector valve operating lever 95 is provided with an extension 116, the end of which is in the form of a yoke 117. The two parts of this yoke are disposed at opposite sides of the plunger 112 in an annular groove or recess 118 therein whereby the lever 95 will be rocked upon movement of the plunger 112 in either direction from a normal or neutral position shown in the drawing.

A cover 120 is secured to the manually operative control device and is provided with a slot 121 in which the operator's control lever 109 is arranged to move for controlling the sequence of operation of the selector valve devices 76 and 77 and of the self-lapping valve device 78. This slot has a central portion 122 providing for movement of the operator's lever 109 lengthwise of the rock shaft 101 for controlling the two selector valve devices 76 and 77, while retaining the rock shaft 101 in a neutral position providing for operation of the self-lapping valve device 78 to maintain pipe 62 open to the atmosphere. At the end of the portion 122 of slot 121 the lever 109 may be moved at right angles into a portion 123 of said slot for thereby rocking the rock shaft 101 out of the neutral position for actuating the self-lapping valve device 78 to supply fluid to pipe 62 at a pressure dependent upon the extent of movement from the portion 122. At the opposite end of the portion 122 of the slot, the lever 109 is movable into a right angular portion 124 for rocking the rock shaft 101 in the opposite direction to effect, however, the same operation of the self-lapping valve device 78 to provide fluid in pipe 62 at a pressure dependent upon the extent of movement from the portion 122 of the slot.

*Operation*

Let it be assumed that the operator's control lever 109 is in its neutral position as shown, thereby causing opening of the pipes 62, 23, and 25 to the atmosphere. Under this condition the pilot piston 14 will occupy its neutral position shown and the valve devices 12 and 13 will be conditioned so that the power piston 6 will also occupy its neutral position as shown, and as a consequence the clutch control arm 3 will be in its "neutral" and disengaged position, for reasons which will be set forth later.

In the neutral position of pilot piston 14 piston chamber 68 in the interlock valve device 53 will be open to the atmosphere through chamber 33 between the two piston heads of the pilot piston, and as a result spring 65 will act to close the supply valve 58 and open the release valve 59 so as to thereby open diaphragm chamber 48 in the fuel supply control motor 43 to the atmosphere to provide for operation of the engine at idling speed.

Now let it be assumed that the operator desires to move the craft in a forward direction. To accomplish this, he moves the lever 109 from its neutral position to the right hand end of the portion 122 of slot 121, as viewed in Fig. 2, and this movement causes the plunger 112 to shift endwise to actuate the lever 95 in a counter-clockwise direction as viewed in Fig. 1. The lever 95 as it is thus operated, actuates the selector valve device 76 to supply fluid under pressure to pipe 23, while the selector valve device 77 demains in the condition shown opening pipe 25 and thereby chamber 24 at one side of the pilot piston to atmosphere. Fluid under pressure thus supplied to pipe 23 flows to chamber 22 at the opposite side of the pilot piston 14 and moves same in the direction of the left hand. The power piston 6 has a greater reluctance to movement than the pilot piston and consequently this movement of the pilot piston is relative to the power piston and turns the lever 18 in a counterclockwise direction about its fulcrum connection with the power piston rod 7 and thereby moves the reach rod 20 to a position in which stop 38 engages jaw 36 which prevents further movement of the pilot piston at this time. This operation of the reach rod 20 operates the valve device 12 to supply fluid under pressure to chamber 9 at one side of the power piston 6, while the valve device 13 remains in the condition opening the power piston chamber 10 to the atmosphere. As a result, the pressure of fluid in chamber 9 acting on the power piston will then move same in the direction of the left hand and thereby rock the lever or clutch arm 3 from the "neutral" position in the direction of the "forward" position.

This movement of the power piston 6 from neutral position toward the left hand is initially relative to the reach rod 20 which at this time is held against movement by contact between stop 38 and jaw 36 under the pressure of fluid on the pilot piston 14, but said pilot piston moves with the power piston 6. The two pistons will thus continue to move together and relative to the reach rod 20 until the stop 28 engaging the pilot piston contacts stop ring 32 which defines the forward position of the pilot piston and prevents further movement thereof in this direction. When this condition is obtained, the power piston 6 will have moved the clutch arm 3 substantially to its "forward" position.

When the clutch arm 3 attains its "forward" position as just described it is desired to release the fluid under pressure from chamber 9 for relieving the clutch arm 3 and thereby the thrust bearings in the clutch of the shifting force. To accomplish this, an unloading valve device 124a is associated with the clutch motor 5 to control the supply of fluid from any suitable source, such as a pipe 125, to the valve devices 12 and 13 for supply to the opposite sides of the power piston 6 for actuating same, and this device is controlled by the pilot piston 14 through passage 35. With passage 35 vented to atmosphere by way of chamber 33 between the pilot piston heads 15 and 16, the unloading valve device 124a operates to open the fluid pressure supply communication between pipe 125 and valve devices 12 and 13, but upon movement of the pilot piston to the extreme left hand or forward position passage 35 is connected to chamber 22. Fluid under pressure then flows from chamber 22 to passage 35 and from thence to the unloading valve device 124a which device responds to the supply of fluid under pressure to cut off the supply of fluid under pressure through the valve device 12 to the power piston chamber 9, and to open said chamber to the atmosphere thereby relieving the clutch arm 3 and clutch bearings of actuating pressure.

With the pilot piston 14 out of its extreme left hand or forward position opening passage 35 to the atmosphere, it will be noted that chamber 68 in the interlock valve device 53 is vented so that the interlock valve device 53 will remain in the condition in which it is shown which insures operation of the engine only at idling speed. However, after the pilot piston attains its forward position, in which the clutch is substantially in its "forward" position, fluid under pressure supplied to passage 35 will also flow to chamber 68 in the interlock valve device, this supply occurring at the same time as to the unloading valve device 124a. The fluid under pressure thus supplied to chamber 68 in interlock valve device 53 then moves the piston 66 therein in the direction of the left hand which seats the valve 59 and opens the valve 58 thereby connecting pipe 52 to pipe 62 leading to operator's control valve device 75.

If the operator now desires to accelerate the engine to a speed above idling he moves the lever 109 out of the portion 122 of slot 121 into the portion 123 for thereby actuating the self-lapping valve device 78 to increase the pressure of fluid in pipe 62 and thereby in chamber 48 of the power control motor 43 to a degree depending upon the extent of movement of said lever as determined by the desired speed or output of the engine. The pressure of fluid thus supplied to diaphragm chamber 48 then deflects diaphragm 44 against the opposing power of spring 49 and actuates the fuel supply arm 41 out of its idling position to the desired fuel supply position.

It will be noted that, as so far described, the lever 109 may be moved to the right hand end of the portion 122 of slot 121 and then immediately into the speed control portion 123 of said slot without waiting for operation of the clutch motor 5 to move the clutch control arm 3 to its forward position, but the engine will not be accelerated in response to such movement due to the interlock valve device 53 which insures that the engine speed will not be increased until after operation of the clutch motor 5 to move the clutch control arm 3 to its "forward" position.

If the operator now desires to move the clutch arm 3 from "forward" position back to "neutral" position he returns the control lever 109 to its neutral position in which it is shown in Figs. 1 and 2. This movement of lever 109 first effects operation of the self-lapping valve device 78 to open pipe 62 and thereby diaphragm chamber 48 in the power motor 43 to the atmosphere to provide for operation of said motor to reduce the speed of the engine to idling. The lever 109 as it is thus operated actuates the plunger 112 to return the selector valve control lever 95 to its normal position in which it is shown for thereby effecting operation of the selector valve device 76 to open pipe 23 and thus chamber 22 at one side of the pilot piston to atmosphere.

Upon this venting of fluid under pressure from chamber 22, spring 26 returns the pilot piston 14 toward its neutral position and this movement of the pilot piston actuates lever 18 and thereby reach rod 20 to a position in which stop 37 contacts the jaw 36. This movement of the reach rod 20 permits such movement of the pilot piston as to open passage 35 to the atmosphere to thereby provide for operation of the unloading valve device 124a to open communication between the fluid pressure supply pipe 125 and the valve device 13 and such movement of the reach rod 20 also operates the valve device 13 to open the fluid pressure supply communication to chamber 10. Fluid under pressure then flows from pipe 125 to chamber 10 and acts on the power piston 6 to move same in the direction of the right hand pulling the clutch lever 3 from "forward" position toward its "neutral" position. When the power piston 6 thus starts moving, the pilot piston 14 initially moves therewith until the collar 29 on stop ring 28 engages the casing at which time the pilot piston movement will cease. However, the power piston will continue to move toward the right hand relative to the pilot piston, and such movement will rock the lever 18 about the fulcrum connection with the pilot piston rod 17 and pull the reach rod 20 back toward its normal position shown. The reach rod 20 as it thus moves will actuate the valve device 13 to open the power piston chamber 10 to atmosphere at substantially the time said piston obtains its neutral position shown. Fluid under pressure will then be vented from chamber 10 for stopping the power piston 6 in its neutral position and for thereby stopping the clutch lever 3 in its "neutral" position.

Fluid under pressure is vented from passage 35 upon the initial movement of the pilot piston 14 out of its left hand position as above described. Piston chamber 68 in the interlock valve device 53 is thus opened to the atmosphere by way of passage 35 and as a result spring 65 will seat the supply valve 68 and open the valve 59 to connect pipe 52 to the atmosphere to thereby provide for operation of the engine at idling speed when the clutch is disengaged.

If the operator now desires to move the clutch arm 3 from "neutral" position to the "astern" position he moves the lever 109 to the left hand end of the portion 122 of slot 121 and if desired he may then move it into the portion 124 of said slot. The lever 109 as it is thus moved operates the plunger 112 to rock the lever 95 in a clockwise direction for actuating the selector valve device 77 to supply fluid under pressure to pipe 25 while allowing the selector valve device 76 to remain in the condition opening pipe 23 to the atmosphere.

The pressure of fluid thus supplied to pipe 25 flows into chamber 24 and moves the pilot piston 14 in the direction of the right hand until the stop 37 on the reach rod 20 engages the jaw 36. The reach rod 20 as it is thus moved actuates the valve device 13 for supplying fluid under pressure to chamber 10 wherein it acts on the power piston 6 to move same and thereby the clutch arm 3 in the direction from "neutral" position towards the "astern" position. As the power piston is thus moved it rocks the lever 18 about its connection with the reach rod 20 which permits the pilot piston 14 to move in the same direction, and this movement continues until the pilot piston attains its right hand or reverse position in which passage 35 is opened to the pilot piston chamber 24 and at which time the power piston 6 will have moved the clutch arm 3 substantially into its "astern" position. When this condition is obtained, fluid pressure will flow from chamber 24 to passage 35 for actuating the unloading valve device 124a to open chamber 10 to the atmosphere for thereby relieving the piston 6 and thereby the clutch operating arm 3 of actuating force. Fluid under pressure supplied to passage 35 also flows to the interlock valve device 53 and actuates same to connect pipe 52 to pipe 62 so that the power motor 43 may operate to accelerate the engine to a speed determined by the position of the lever 109 in the portion 124 of slot 121.

If the operator now desires to return the clutch arm 3 from the "astern" position to the "neutral" position he returns the lever 109 to its neutral position shown in Fig. 2 for thereby effecting operation of the self-lapping valve device 78 to open pipe 62 to the atmosphere followed by operation of the selective valve device 77 to open pipe 25 to the atmosphere. The power motor 43 will thus be operated to provide for reducing the speed of the engine to idling; the clutch control motor will operate to move the clutch arm 3 back to its "neutral" position, and the interlock valve device 53 will also operate to open the speed control pipe 52 to the atmosphere, in a manner which will be apparent from the above description.

Let it be assumed that the operator's lever 109 is positioned in the portion 123 of slot 121 providing for the clutch arm 3 being in "forward" position and the engine operating at a speed above idling, and that it is desired to reverse the direction of movement of the craft. To accomplish this, the operator may move the lever 109 out of the portion 123 of slot 121 into the portion 122 and then to the left hand end thereof as viewed in Fig. 2 and into the portion 124. The lever 109 as it is thus moved will actuate the plunger 112 and thereby lever 95 to effect operation of the selector valve device 76 to open pipe 23 and thereby the pilot piston chamber 22 to the atmosphere, and at the same time will operate the selective valve device 77 to supply fluid under pressure to pipe 25, and from thence, to pilot piston chamber 24. With the pilot piston chamber 22 thus opened to the atmosphere and fluid under pressure supplied to chamber 24, the pilot piston 14 will be moved from its extreme left hand or forward position in the direction of the right hand until the stop 37 on the reach rod 20 engages the jaw 36. In this position of the pilot piston passage 35 is opened to atmosphere so that the unloading valve device 124a will open communication between the fluid pressure supply pipe 125 and the valve devices 12 and 13. The reach rod 20 as it is thus operated actuates the valve device 12 to open the power piston chamber 9 to the atmosphere and at the same time actuates the valve device 13 to supply fluid under pressure, supplied through the unloading valve device 124a, to chamber 10 to move the power piston 6 and thereby the clutch arm 3 from the "forward" position toward their "astern" position. The pilot piston 14 will move with the power piston 6 as previously described while the reach rod 20 remains stationary, until the pilot piston attains substantially its extreme right-hand or reverse position and opens passage 35 to chamber 24, at which time, the power piston 6 will also be substantially in its right hand position and with the clutch arm 3 in its "astern" position. When this condition is obtained fluid pressure will then be supplied through passage 35 to the unloading valve device 124a for operating same to open chamber 10 to the atmosphere for thereby relieving the power piston 6 and clutch arm 3 of actuating force.

When the lever 109 is moved from the portion 123 of slot 121 through the portion 122 into the portion 124, it will be noted that the self-lapping valve device 78 will be operated to first vent fluid under pressure from pipe 52 and then to immediately resupply fluid under pressure to said pipe. This however, is immaterial since initial movement of the pilot piston 14 out of its extreme left hand position causes operation of the interlock valve device 53 to break the connection between pipes 62 and 52 and open the latter to atmosphere and this connection is maintained until the pilot piston 14 and thereby the power piston 6 obtain substantially the extreme right hand positions. Thus upon this operation of the operator's lever 109 the fuel control motor 43 will operate to provide for operation of the engine at idling speed and retain this condition until the clutch arm 3 has attained its "astern" position.

In case the craft is moving in an astern direction and the operator desires that the craft move forwardly he will move the lever 109 to the right hand end of the portion 122 of slot 121 and then into the portion 123 of said slot, and the apparatus will function in a manner which will be apparent from the above description to first provide for reducing the engine speed at idling and for then shifting the clutch arm 3 from the "astern" to its "forward" position while retaining this reduced speed condition of the engine. Then after the "forward" position of the clutch arm 3 is obtained, the interlock valve device 53 will operate to provide for acceleration of the engine to the desired degree determined by the position of the operator's lever 109.

The construction of the parts of the apparatus with the exception of the manually operative control device 75, and the operation of said parts including said device, as so far described, is substantially the same as of the apparatus disclosed in the aforementioned pending application.

From the above description it will be noted that through the medium of the interlock valve device 53 as controlled by the pilot piston 14 through passage 35, the engine cannot be accelerated above idling speed with the clutch disengaged. The interlock valve device also provides for the speed of the engine being reduced to idling upon disengagement of the clutch, but it does not insure this being obtained under all conditions of operation; such as upon rapid movement of the operator's lever 109 from, for instance, forward full speed position at the upper end of the portion 123 of slot 121 to the reverse full speed position at the lower end of portion 124 of said slot, or vice versa, since inertia of the moving parts of the engine and clutch may prevent the engine speed reducing with the reduction in fluid pressure in chamber 48 of the power control motor 43. It is thus possible for the operator to move the lever 109 from the full speed forward position to the full speed astern position with such rapidity as to cause the clutch arm 3 to move from its "forward" position to its "astern" position for disengaging and then reengaging the clutch before the engine speed can be reduced to idling or some other relatively low degree, and this of course might result in damage to the clutch, engine or other parts of the system.

The invention, which will now be described, consists of interlock means for insuring that the speed of the engine will be reduced to a chosen low degree before the clutch can be engaged under conditions such as just set forth. This interlock means is preferably in the form of a finger or member 130 arranged to move into the path of movement of lever 109 through the portion 122 of slot 121 for preventing said lever being moved from one end of said portion of said slot to the opposite end for effecting disengagement of the clutch in either "forward" or "astern" position of arm 3 and then reengagement in the other position, until after a period of time has expired which is adequate to insure that the speed of the engine will be reduced to a chosen low degree.

The member 130 is rockable about a pin 131 secured in the cover 120 and is provided with a slot 132 to allow a certain movement of said member relative to said pin in order to permit movement of the operator's lever 109 substantially to its neutral position upon engagement with either side of said member. A spring 133 having one end anchored to the cover 120 is connected under tension to the member 130 for pulling said member out of the path of movement of the operating lever 109. For moving said member into the path of movement of lever 109, a movable abutment preferably in the form of a flexible diaphragm 134 is provided. This diaphragm has one side connected with the member 130 through the medium of a rod 135 and at its opposite side there is provided a chamber 136 which is connected through a pipe 137 to the speed control pipe 62 leading to the self-lapping valve device 78.

With this arrangement, when the operator's lever 109 is in either portion 124 or portion 123 of slot 121 providing for operation of the engine at a speed above idling, the pressure of fluid supplied to pipe 62 for controlling the engine speed also equalizes through pipe 137 into chamber 136, wherein it acts on diaphragm 134 for deflecting same to move the member 130 into the path of movement of lever 109 through the portion 122 of slot 121.

Now if the operator desires to suddenly reverse the direction of movement of the craft he will move the lever 109 out of the portion 123 or portion 124 of slot 121 into the portion 122 and against the member 130 which will then prevent movement of said lever to the opposite end of portion 122 of the slot. The slot 132 in member 130 however provides for lever 109 being moved to substantially its neutral position in which the clutch control motor 5 may operate to return the clutch arm 3 from either its "forward" position or its "astern" position to its "neutral" position for disengaging the clutch, and also in which the self-lapping valve device 78 opens the speed control pipe 62 to atmosphere. The pressure of fluid in chamber 136 will then reduce by way of a choke 138, pipe 137, and pipe 62, and when reduced to a chosen low degree, spring 133 will move the member 130 out of the path of movement of the lever 109 whereupon the operator may move said lever to the desired end of the portion 122 of slot 121 for thereby causing operation of said control member 5 to move the clutch arm 3 to its opposite clutch engaging position. The choke 138 is of such size with respect to the volume of chamber 136 as to insure the member 130 holding the operator's lever 109 against movement for reversing the clutch until the speed of the engine is reduced to the desired low degree, so that the clutch cannot be engaged in either its "forward" or "astern" position with the engine operating above such chosen speed.

*Summary*

From the above description it will now be seen that I have provided an improved system for controlling the speed or power output of a prime mover, such as an internal combustion engine, and the operation of a three position reversing clutch for connecting and disconnecting said prime mover to and from a device to be driven which prevents reversing of the clutch and thereby the connection between the prime mover and device with the prime mover operating above a chosen speed and which then prevents acceleration of the prime mover until after the clutch is operated to substantially establish the drive connection between the prime mover and device. The means for preventing reversal of the clutch drive connection with the prime mover operating above chosen speed is conditioned from the speed control pipe while the prime mover is operating in excess of the chosen speed, to provide a delay period proportional to the degree of such excess in order to insure the required deceleration of the prime mover from any previous speed to allow reversal of the drive connection. The chosen speed of the prime mover at which reversal of the drive connection may be effected may be idling speed or a speed greater than idling, if desired. After the speed of the prime mover has been thus reduced to allow reversal of the clutch, means controlled by the clutch operating means prevents acceleration of the prime mover until the clutch is substantially reengaged.

Having now described my invention, what I claim as new and desire to secure by Letters Patent is:

1. In combination, a control lever having a first position for effecting a desired operation, a second position for effecting a different desired operation and being movable beyond said second position for effecting a still different desired operation, a member arranged to prevent movement of said lever from said second position to said first position, actuating means conditioned upon said movement of said lever beyond said second position to render said member effective, and timing means cooperative with said actuating means upon return of said lever from beyond said second position to said second position to maintain said member effective for a certain interval of time after said return of said lever to said second position.

2. In combination, a control lever having a first position for effecting a desired operation, a second position for effecting a different desired operation and being movable beyond said second position for supplying fluid to a pipe to effect a still different operation, and being movable back to said second position to release fluid under pressure from said pipe, a member operable to prevent movement of said lever from said second position to said first position, means operable upon an increase in pressure in said pipe to a certain degree to render said member effective, and means operable upon a reduction in pressure of fluid in said pipe to below said certain degree to render said member ineffective.

3. In combination, a control lever having a first position for effecting a desired operation, a second position for effecting a different desired operation and being movable beyond said second position for supplying fluid to a timing chamber at a pressure proportional to the extent of such movement and being operable upon return to said second position for releasing fluid under pressure from said chamber, a member arranged to prevent movement of said lever from said second position to said first position, means controlled by pressure of fluid in said chamber controlling said member and operable when such pressure exceeds a certain degree to render said member effective and when less than said certain degree to render said member ineffective, and means for restricting the release of fluid under pressure from said chamber.

4. In combination, a control lever having a first position for effecting a desired operation, a second position for effecting a different desired operation and being movable beyond said second position for supplying fluid to a pipe at a pressure proportional to the extent of such movement and being movable back to said second position to open said pipe to atmosphere, a timing chamber open to said pipe to be charged with fluid at the pressure supplied to said pipe, a choke for restricting the release of fluid under pressure from said chamber to said pipe, a member arranged to hold said lever against movement from said second position to said first position, and means for controlling said member controlled by pressure of fluid in said chamber and operable when such pressure exceeds a certain degree to render said member effective and when less than said certain degree ineffective.

5. In combination, a control lever having two different positions for effecting different operations, a pipe, valve means operable to supply fluid under pressure to said pipe to effect a third operation, a member arranged to prevent movement of said lever from one of said two positions to the other, means for controlling said member operable upon a certain increase in pressure in said pipe to render said member effective, and means operable when the pressure in said pipe is of a lower degree to render said member ineffective.

6. In combination, a control lever having two different positions for effecting different operations, a pipe, valve means operable to supply fluid under pressure to said pipe to effect a third operation, a member arranged to prevent movement of said lever from one of said two positions to the other, means for controlling said member operable upon a certain increase in pressure in said pipe to render said member effective, and means operable when the pressure in said pipe is of a lower degree to render said member ineffective, said lever having a movement beyond one of said two positions for effecting operation of said valve means to supply fluid under pressure to said pipe and being operable upon return to said one of said two positions to effect operation of said valve means to release fluid under pressure from said pipe.

7. An apparatus for governing the speed of a prime mover and for controlling the connecting and disconnecting of said prime mover to and from a member to be driven comprising in combination, a pipe through which the speed of said prime mover is arranged to be adjusted in accordance with pressure of fluid in said pipe, valve means operable to adjust the pressure of fluid in said pipe, a control lever having one drive position for connecting said prime mover to said device to cause said device to be driven in one direction and a second drive position for connecting said prime mover to said device to cause said device to be driven in the reverse direction, a member arranged to hold said lever against movement from one of said drive positions to the other, means controlling said member and operable by a certain pressure of fluid in said pipe to render said member effective, and means operative to render said member ineffective when the pressure of fluid in said pipe is less than said certain pressure.

8. An apparatus for governing the speed of a prime mover and for controlling the connecting and disconnecting of said prime mover to and from a member to be driven comprising in combination, a pipe through which the speed of said prime mover is arranged to be adjusted in accordance with pressure of fluid in said pipe, valve means operable to adjust the pressure of fluid in said pipe, a control lever having one drive position for connecting said prime mover to said device to cause said device to be driven in one direction and a second drive position for connecting said prime mover to said device to cause said device to be driven in the reverse direction, said lever also having a non-driving position between the two drive positions for disconnecting said prime mover from said device, a member arranged to hold said lever against movement from either of said drive positions to the other but at the same time providing for movement of said lever from either drive position substantially to said non-driving position, and means controlling said member controlled by pressure of fluid from said pipe and operable when such pressure exceeds a chosen degree to render said member effective and when less than said certain degree ineffective.

9. An apparatus for governing the speed of an internal combustion engine and the operation of a clutch to connect said engine to a device to drive said device in either one direction or the opposite direction or to disconnect said engine from said device, said apparatus comprising in combination, a speed control motor adjustable by fluid pressure to vary the speed of said engine in proportion to the pressure of such fluid, valve means operable to supply fluid under pressure to and release fluid under pressure from said motor for regulating the speed of said engine, a control lever having a first drive position for conditioning said clutch to connect said engine to said device to drive said device in one direction, a second drive position for conditioning said clutch to connect said engine to said device to drive said device in the opposite direction and a third position for conditioning said clutch to disconnect said device from said engine, a member arranged to cooperate with said lever to secure same against movement from said first position to said second position or vice versa but providing for movement from either said first or second position substantially to said third position, a movable abutment connected to said member and controlled by pressure of fluid supplied to said speed control motor and operable when such pressure exceeds a chosen degree to render said member effective, and means operative to render said member ineffective when the pressure of fluid acting in said speed control motor is of a lower degree.

10. An apparatus for governing the speed of an internal combustion engine and the operation of a clutch to connect said engine to a device to drive said device in either one direction or the opposite direction or to disconnect said engine from said device, said apparatus comprising in combination, a speed control motor adjustable by fluid pressure to vary the speed of said engine in proportion to the pressure of such fluid, valve means operable to supply fluid under pressure to and release fluid under pressure from said motor for regulating the speed of said engine, a control lever having a first drive position for conditioning said clutch to connect said engine to said device to drive said device in one direction, a second drive position for conditioning said clutch to connect said engine to said device to drive said device in the opposite direction and a third position for conditioning said clutch to disconnect said device from said engine, a member arranged to cooperate with said lever to secure same against movement from said first position to said second position or vice versa but providing for movement from either said first or second position substantially to said third position, a movable abutment connected to said member controlled by pressure of fluid in a chamber and operable when said pressure exceeds a chosen degree to render said member effective, means operable to render said member ineffective upon a reduction in pressure in said chamber to a lower degree, a communication connecting said chamber and pipe providing for charging of said chamber with fluid at the pressure supplied to said pipe and providing for release of fluid under pressure from said chamber by way of said pipe, and a choke in said communication for restricting the release of fluid under pressure from said chamber to said pipe.

11. An apparatus for governing the speed of an internal combustion engine and the operation of a clutch to connect said engine to a device to drive said device in either one direction or the opposite direction or to disconnect said engine from said device, said apparatus comprising in combination, a speed control motor adjustable by fluid pressure to vary the speed of said engine in proportion to the pressure of such fluid, valve means operable to supply fluid under pressure to and release fluid under pressure from said motor for regulating the speed of said engine, a control lever having a first drive position for conditioning said clutch to connect said engine to said device to drive said device in one direction, a second drive position for conditioning said clutch to connect said engine to said device to drive said device in the opposite direction and a third position for conditioning said clutch to disconnect said device from said engine, a member arranged to cooperate with said lever to secure same against movement from said first position to said second position or vice versa but providing for movement from either said first or second position substantially to said third position, a movable abutment connected to said member and controlled by pressure of fluid supplied to said speed control motor and operable when such pressure exceeds a chosen degree to render said member effective, and means operative to render said member ineffective when the pressure of fluid acting in said speed control motor is of a lower degree, the said positions of said lever being so arranged as to provide for movement of said lever in the same plane from one to the other, said lever being also movable out of said plane, and means operable by said lever upon movement out of said plane to effect operation of said valve means to supply fluid under pressure to said pipe and upon return to said plane to effect operation of said valve means to open said pipe to atmosphere.

12. A system for controlling the speed of an internal combustion engine and the connecting and disconnecting of said engine to and from a device to be driven, said system comprising in combination, power control means adjustable to vary the speed of said engine, a lever having one position for disconnecting said engine from said device and another position for connecting said engine to said device, and means conditionable in accordance with adjustment of said power control means for controlling movement of said lever and operative to prevent movement of said lever from said one position to the other position with said power control means adjusted to provide operation of said engine at a speed exceeding a certain chosen speed, and to provide for movement of said lever from said one position to said other position with said power control means adjusted to provide for operation of said engine at a speed below said chosen speed.

13. A system for controlling the speed of an internal combustion engine and the connecting and disconnecting of said engine to and from a device to be driven, said system comprising in combination, power control means adjustable by fluid under pressure to vary the speed of said engine in accordance with the degree of such pressure, valve means for varying the pressure of fluid on said control means from a chosen low degree providing for operation of said engine at a chosen reduced speed through a range to a higer degree to provide for corresponding increase in speed of said engine, a lever having one position for disconnecting said engine from said device and another position for connecting said engine to said device, interlock means operable by a chosen pressure of fluid supplied by said valve means to prevent movement of said lever from said one position to the other position, and means operable upon a reduction in pressure of fluid on said interlock means to below said chosen pressure to render said interlock means ineffective.

14. A control device for controlling the speed of a prime mover and the positioning of a clutch control member for connecting and disconnecting said prime mover to and from a device to be driven, said clutch control member having two driving positions, and an intermediate non-driving position, said control device comprising in combination a control lever having a first position for effecting movement of said clutch control member to one of said driving positions, a second position for effecting movement of said clutch control member to the other of said driving positions, and a third position for effecting movement of said clutch control member to said non-driving position, means conditionable by said lever in said first, second, and third positions to provide for operation of said engine at a chosen low or idling speed, said lever having beyond each of said first and second positions a speed control zone and being movable into either of said zones to effect operation of said means to increase the speed of said engine, delay means arranged to prevent movement of said lever from either one of said first or second positions in the direction of the other past said third position, and means for controlling said delay means operative in accordance with the speed of said prime mover to render said delay means effective when said engine speed is above a chosen degree and ineffective when below said chosen degree.

15. A control device for controlling the speed of a prime mover and the positioning of a clutch control member for connecting and disconnecting said prime mover to and from a device to be driven, said clutch control member having two driving positions, and an intermediate non-driving position, said control device comprising in combination a control lever having a first position for effecting movement of said clutch control member to one of said driving positions, a second position for effecting movement of said clutch control member to the other of said driving positions, and a third position for effecting movement of said clutch control member to said non-driving position, means conditionable by said lever in said first, second and third positions to provide for operation of said engine at a chosen low or idling speed, said lever having beyond each of said first and second positions a speed control zone and being movable into either of said zones to effect operation of said means to increase the speed of said engine, delay means movable upon movement of said lever into either of said zones into the path of movement of said lever between said first and second positions and operable upon return of said lever from either of said zones to the adjacent one of said first or second positions to provide for movement of said lever to said third position but to prevent movement of said lever to the other one of said first or second positions, and means operable a certain time interval after movement of said lever out of either said zones to the adjacent one of said first or second positions to move said delay means out of the path of movement of said lever.

16. A control device for controlling the speed of a prime mover and the positioning of a clutch control member for connecting and disconnecting said prime mover to and from a device to be driven, said clutch control member having two driving positions, and an intermediate non-driving position, said control device comprising in combination a control lever having a first position for effecting movement of said clutch control member to one of said driving positions, a second position for effecting movement of said clutch control member to the other of said driving positions, and a third position for effecting movement of said clutch control member to said non-driving position, means conditionable by said lever in said first, second and third positions to provide for operation of said engine at a chosen low or idling speed, said lever having beyond each of said first and second positions a speed control zone and being movable into either of said zones to effect operation of said means to increase the speed of said engine, delay means operable to prevent movement of said lever to said second position upon movement into said first position from the adjacent speed zone and to said first position upon movement from the other speed zone but providing for movement of said lever substantially into said third position, means operable to render said delay means effective upon movement of said lever into either of said speed zones, means operable to render said delay means ineffective, and control means providing for operation of the last named means a chosen interval of time after movement of said lever out of either of said zones.

17. A control device for controlling the speed of a prime mover and the positioning of a clutch control member for connecting and disconnecting said prime mover to and from a device to be driven, said clutch control member having two driving positions, and an intermediate non-driving position, said control device comprising in combination a control lever having a first position for effecting movement of said clutch control member to one of said driving positions, a second position for effecting movement of said clutch control member to the other of said driving positions, and a third position for effecting movement of said clutch control member to said non-driving position, means conditionable by said lever in said first, second and third positions to provide for operation of said engine at a chosen low or idling speed, said lever having beyond each of said first and second positions a speed control zone and being movable into either of said zones to effect operation of said means to increase the speed of said engine, delay means conditionable upon movement of said lever into either of said zones to prevent movement of said lever to the said first or second position which is adjacent the other of said zones, means operable a certain interval of time after movement of said lever out of either of said zones to the adjacent one of said first or second positions to render said delay means ineffective, and means controlling said time interval.

18. A control device for controlling the speed of a prime mover and the positioning of a clutch control member for connecting and disconnecting said prime mover to and from a device to be driven, said clutch control member having two driving positions, and an intermediate non-driving position, said control device comprising in combination a control lever having a first position for effecting movement of said clutch control member to one of said driving positions, a second position for effecting movement of said clutch control member to the other of said driving positions, and a third position for effecting movement of said clutch control member to said non-driving position, means conditionable by said lever in said first, second and third positions to provide for operation of said engine at a chosen low or idling speed, said lever having beyond each of said first and second positions a speed control zone and being movable into either of said zones to effect operation of said means to increase the speed of said engine, a blocking member movable into and out of the path of movement of said lever between the said first and second positions and operable when in such path to provide for movement of said lever from said first or second position to said third position but to prevent movement of said lever between said first and second positions, a movable abutment controlled by pressure of fluid in a chamber and operable when such pressure exceeds a chosen degree to move said blocking member into the path of movement of said lever, means operable when the pressure of fluid in said chamber is reduced to said chosen degree to move said blocking member out of the path of movement of said lever, valve means operable upon movement of said lever into either of said zones to supply fluid under pressure to said chamber and upon movement out of such zone to provide for release fluid under pressure from said chamber, and means arranged to restrict the rate of release of fluid under pressure from said chamber to provide said chosen degree of pressure therein a certain interval of time after movement of said member out of either of said zones.

19. In combination, three fluid control pipes, valve means for controlling the pressure of fluid in two of said pipes, a valve device for controlling the pressure of fluid in the third pipe, a control lever having a neutral position and operative therein to effect operation of said valve means to open the respective pipes to atmosphere and operative upon movement from said neutral position in one direction to a second position to effect operation of said valve means to supply fluid under pressure to one of said two pipes and to open the other of said two pipes to atmosphere and operative upon movement from neutral position in another direction to a third position to supply fluid under pressure to said other of said two pipes and open said one of said two pipes to atmosphere, said lever in said neutral, second and third positions providing for operation of said valve device to open said third pipe to atmosphere and being operative upon further movement in either of said directions beyond said second or third positions to retain the respective one of said two pipes supplied with fluid under pressure and to supply fluid under pressure to said third pipe, a movable abutment subject to pressure of fluid in a chamber open to said third pipe, means controlled by said abutment arranged to prevent movement of said lever from said second position through said neutral position to said third position, and from said third position through said neutral position to said second position and rendered effective by a certain pressure of fluid in said chamber on said abutment and ineffective upon a lower pressure of fluid in said chamber, and means arranged to destrict the release of fluid under pressure from said chamber in said neutral, second and third positions of said lever.

20. In combination, three fluid control pipes, valve means for controlling the pressure of fluid in two of said pipes, a valve device for controlling the pressure of fluid in the third pipe, a control lever having a neutral position and operative therein to effect operation of said valve means to open the respective pipes to atmosphere and operative upon movement from said neutral position in one direction to a second position to effect operation of said valve means to supply fluid under pressure to one of said two pipes and to open the other of said two pipes to atmosphere and operative upon movement from neutral position in another direction to a third position to supply fluid under pressure to said other of said two pipes and open said one of said two pipes to atmosphere, said lever in said neutral, second and third positions providing for operation of said valve device to open said third pipe to atmosphere and being operative upon further movement in either of said directions beyond said second or third positions to retain the respective one of said two pipes supplied with fluid under pressure and to supply fluid under pressure to said third pipe, a member movable into and out of the path of movement of said lever and shiftable when in said path to provide for movement of said lever from said second position to said neutral position but to prevent movement of said lever to said third position and to provide for movement of said lever from said third position to said neutral position but to prevent movement of said lever to said second position, a movable abutment connected to said member and subject to pressure of fluid in a chamber open to said third pipe and operable upon a certain increase in pressure in said chamber to move said member into the path of movement of said lever, means operable upon a reduction in pressure in said chamber by flow of fluid therefrom to said third pipe to move said member out of the path of movement of said lever, and means arranged to retard the rate of reduction in pressure in said chamber by flow back to said third pipe.

21. A control valve device comprising a control lever having a neutral position and at one side thereof a second position and at the opposite side a third position, all of said positions being arranged in the same plane, said lever being movable beyond said second position into a certain control zone and beyond said third position into a different control zone, a chamber, valve means operable by said lever upon movement into either of said control zones to supply fluid under pressure to said chamber, said lever in all of said positions effecting operation of said valve means to vent fluid under pressure from said chamber, control means movable upon a certain increase in pressure of fluid supplied to said chamber into cooperative relation with said lever to hold same against movement from said second position to said third position or from said third position to said second position, release means operable upon a reduction in pressure of fluid in said chamber to a certain chosen degree to move said control means out of cooperative relation with said lever to render said lever movable to any of its different positions, and means for restricting the rate of venting of fluid under pressure from said chamber.

22. A control valve device comprising a control lever having a neutral position and at one side thereof a second position and at the opposite side a third position, all of said positions being arranged in the same plane, said lever being movable beyond said second position into a certain control zone and beyond said third position into a different control zone, a chamber, valve means operable by said lever upon movement into either of said control zones to supply fluid under pressure to said chamber, said lever in all of said positions effecting operation of said valve means to vent fluid under pressure from said chamber, a member movable into and out of the path of movement of said lever between said positions and operable when in said path to secure said lever against movement from said second position to said third position or from said third position to said second position and shiftable by contact with said lever to render said lever movable from either said second or third positions to said neutral positions, means operable upon a certain increase in pressure in said chamber to move said member into the path of movement of said lever, release means operable upon a reduction in pressure of fluid in said chamber to a certain low degree to move said control member out of the path of movement of said lever, and means for restricting the venting of fluid under pressure from said chamber to thereby delay operation of said release means.

23. A system for controlling the speed of a prime mover and the operation of clutch control means to connect and disconnect said prime mover to and from a device to be driven, comprising in combination, a pipe, a fluid motor operable to vary the speed or output of said prime mover in accordance with the pressure of fluid in said pipe, a control device comprising a lever having a neutral position for effecting operation of the clutch control means to disconnect said prime mover from said device, and at one side of said neutral position a second position, for effecting operation of said clutch control means to connect said prime mover to said device, and at the opposite side of said neutral position a third position for also effecting operation of said clutch control means to connect said prime mover to said device, valve means controlled by said lever for controlling the pressure of fluid in said pipe and conditionable by said lever in said neutral, second and third positions to open said pipe into atmosphere, said lever having one speed control zone beyond said second position and another speed control zone beyond said third position and being operable upon movement into either of said zones to effect operation of said valve means to supply fluid to said pipe at a pressure proportional to the extent of movement away from said second or third positions, a latch associated with said control device for movement into and out of the path of movement of said lever between said second and third positions and being operable when in said path of movement to hold said lever against movement from said second position to said third position or from third position to said second position but providing for movement of said lever from either said second or third positions to said neutral position, a movable abutment connected to said latch and subject to pressure of fluid in a chamber open to said pipe and operable upon a certain increase in pressure of fluid in said chamber to move said latch into the path of movement of said lever, means connected to said latch operative to move same out of the path of said lever upon a reduction in pressure of fluid in said chamber to a certain low degree by flow therefrom through said pipe, and means for restricting the release of fluid under pressure from said chamber to said pipe.

24. A system for controlling the speed or power output of a prime mover and the operation of a clutch control member to connect and disconnect said prime mover to and from a member to be driven, said clutch control member having a neutral position for disconnecting said prime mover and member and at either side of said neutral position a driving position for connecting neutral position a driving position to said member, said system comprising in combination, a power motor adjustable by fluid pressure to vary the speed of said prime mover in proportion to pressure of such fluid, a pipe for supplying fluid under pressure to and releasing fluid under pressure from said motor, a control device comprising a lever having a neutral position and at one side thereof a second position and at the opposite side a third position, means operable upon movement of said lever to said neutral position to effect movement of said clutch control member to its neutral position and upon movement of said lever to said second position to effect movement of said clutch control member to one of its driving positions, and upon movement of said lever to said third position to effect movement of said clutch control member to its other driving positions, said lever having beyond said second position a speed control zone and beyond said third position another speed control zone, valve means for controlling the pressure of fluid in said pipe and controlled by said lever, said lever being operative upon movement into either of said zones to effect operation of said valve means to supply fluid to said pipe at a pressure proportional to the extent of movement away from said second or third positions and being operative in said neutral, second and third positions thereof to effect operation of said valve means to open said pipe to atmosphere, a stop member in said control device arranged to be moved into and out of the path of movement of said lever between said second and third positions and being operative when in said path of movement to block said lever against movement from said second position to said third position or from said third position to said second position while providing for movement of said lever from either said second or third positions to said neutral position, a movable abutment connected to said stop member and operable upon an increase in pressure in a chamber above a certain degree to move said stop member into the path of movement of said lever, release means operable upon a reduction in pressure of fluid in said chamber to a lower degree to move said stop member out of the path of movement of said lever, said lever being operable upon movement into either of said zones to effect a supply of fluid under pressure to said chamber and upon movement out of either of said zones to provide for release of fluid under pressure from said chamber, and means for restricting the release of fluid under pressure from said chamber for thereby holding said stop member in the path of movement of said lever for a period of time to provide for reduction in speed of said prime mover to a chosen low degree.

25. An apparatus for controlling the speed of a prime mover and the operation of a reversing clutch to either connect or disconnect said prime mover to or from a member to be driven, said clutch having a forward drive condition for causing movement of said member in one direction and a reverse drive condition for causing movement of said member in the opposite direction, said apparatus comprising clutch control means operable to condition said clutch, power control means operable to adjust the speed of said prime mover, means conditionable in accordance with operation of said power control means to prevent reversal of said clutch drive condition with said prime mover operating at a speed exceeding a chosen degree, and means controlled by said clutch control means operable to prevent operation of said power control means to accelerate said prime mover with said clutch out of either of said drive conditions.

26. An apparatus for controlling the speed of a prime mover and the operation of a reversing clutch to either connect or disconnect said prime mover to or from a member to be driven, said clutch having a forward drive condition for causing movement of said member in one direction and a reverse drive condition for causing movement of said member in the opposite direction, said apparatus comprising power control means adjustable to vary the speed of said prime mover, a lever for controlling said clutch and having a forward drive position and a reverse drive position for correspondingly conditioning said clutch and also having a neutral position between said forward and reverse positions for conditioning said clutch to disconnect said engine from said device, blocking means arranged to prevent movement of said lever from said forward position to said reverse position or vice versa, means operative to render said blocking means ineffective, means conditionable by said power control means to render said blocking means effective with said power control means adjusted to cause operation of said prime mover at a speed above a chosen degree, and means operable in accordance with the condition of said clutch to prevent operation of said power control means to accelerate said prime mover with said clutch out of either of its driving conditions.

27. An apparatus for controlling the speed of a prime mover and the operation of a reversing clutch to either connect or disconnect said prime mover to or from a member to be driven, said clutch having a forward drive condition for causing movement of said member in one direction and a reverse drive condition for causing movement of said member in the opposite direction, said apparatus comprising a motor adjustable by fluid under pressure to vary the speed of said prime mover in proportion to the pressure of such fluid, valve means operable to supply fluid under pressure to and to release fluid under pressure from said motor, a lever for controlling said clutch and having a forward position and a reverse position for correspondingly conditioning said clutch, locking means operable to block movement of said lever from said forward position to said reverse position and vice versa, means subject to pressure of fluid in said motor controlling said locking means and operable when such pressure exceeds a chosen degree to render said locking means effective and when less than said chosen degree ineffective, a valve device for controlling communication through which fluid under pressure is supplied to and released from said motor by said valve means and operable to close said communication and open said motor to atmosphere to provide for operation of said prime mover at a chosen low speed, and means conditionable in accordance with the conditioning of said clutch for controlling said valve device and operable to effect operation of said valve device to close said communication with said clutch out of said driving conditions and to open said communication with said clutch in said driving conditions.

28. An apparatus for controlling the speed of a prime mover and the operation of a reversing clutch to either connect or disconnect said prime mover to or from a member to be driven, said clutch having a forward drive condition for causing movement of said member in one direction and a reverse drive condition for causing movement of said member in the opposite direction, said apparatus comprising a motor adjustable by fluid pressure to vary the speed of said prime mover in proportion to the pressure of such fluid, valve means operable to supply fluid under pressure to and release fluid under pressure from said motor through a speed control pipe for adjusting said motor, an interlock valve device controlling communication through said pipe and operable by fluid under pressure to open said communication and operable upon release of fluid under pressure to close said communication and to open said motor to atmosphere to provide for operation of said prime mover at a chosen reduced speed, clutch control means for controlling the conditioning of said clutch and the operation of said interlock valve device and operable with said clutch in either of its driving conditions to effect operation of said interlock valve device to open communication through said pipe and when out of said driving condition to effect operation of said interlock valve device to close said communication and open said motor to atmosphere, means including a lever for controlling said clutch control means and having a forward position and a reverse position for effecting operation of said clutch control means to correspondingly condition said clutch, interlock means arranged to prevent movement of said lever from said forward position to said reverse position, and means for controlling said interlock means controlled by pressure of fluid in said speed control pipe and operative when such pressure exceeds a chosen degree to render said member effective and when less than said chosen degree ineffective.

29. An apparatus for controlling the speed of a prime mover and the operation of a reversing clutch to either connect or disconnect said prime mover to or from a member to be driven, said clutch having a forward drive condition for causing movement of said member in one direction and a reverse drive condition for causing movement of said member in the opposite direction, said apparatus comprising a motor adjustable by fluid pressure to vary the speed of said prime mover in proportion to the pressure of such fluid, valve means operable to supply fluid under pressure to and release fluid under pressure from said motor through a speed control pipe for adjusting said motor, an interlock valve device controlling communication through said pipe and operable by fluid under pressure to open said communication and operable upon release of fluid under pressure to close said communication and to open said motor to atmosphere to provide for operation of said prime mover at a chosen reduced speed, clutch control means for controlling the conditioning of said clutch and the operation of said interlock valve device and operable with said clutch in either of its driving conditions to effect operation of said interlock valve device to open communication through said pipe and when out of said driving conditions to effect operation of said interlock valve device to close said communication and open said motor to atmosphere, means including a lever for controlling said clutch control means and having a forward position and a reverse position for effecting operation of said clutch control means to correspondingly condition said clutch, interlock means arranged to prevent movement of said lever from said forward position to said reverse position, and means for controlling said interlock means controlled by pressure of fluid in said speed control pipe and operative when such pressure exceeds a chosen degree to render said member effective and when less than said chosen degree ineffective, said lever being movable past said forward and reverse positions into speed control zones, and means connecting said valve means with said lever providing for operation of said valve means by said lever to vary the pressure of fluid in said speed control pipe in proportion to the extent of movement of said lever into said zones away from the adjacent forward or reverse positions, said lever upon movement out of either of said zones being operable to effect operation of said valve means to open said speed control pipe to atmosphere.

30. An apparatus for controlling the speed of a prime mover and the operation of a reversing clutch to either connect or disconnect said prime mover to or from a member to be driven, said clutch having a forward drive condition for causing movement of said member in one direction and a reverse drive condition for causing movement of said member in the opposite direction, said apparatus comprising a motor adjustable by fluid pressure to vary the speed of said prime mover in proportion to the pressure of such fluid, valve means operable to supply fluid under pressure to and release fluid under pressure from said motor through a speed control pipe for adjusting said motor, an interlock valve device controlling communication through said pipe and operable by fluid under pressure to open said communication and operable upon release of fluid under pressure to close said communication and to open said motor to atmosphere to provide for operation of said prime mover at a chosen reduced speed, clutch control means for controlling the conditioning of said clutch and the operation of said interlock valve device and operable with said clutch in either of its driving conditions to effect operation of said interlock valve device to open communication through said pipe and when out of said driving conditions to effect operation of said interlock valve device to close said communication and open said motor to atmosphere, means including a lever for controlling said clutch control means and having a forward position and a reverse position for effecting operation of said clutch control means to correspondingly condition said clutch, interlock means arranged to prevent movement of said lever from said forward position to said reverse position, and means for controlling said interlock means controlled by pressure of fluid in a chamber in constant communication with said speed control pipe and therefore arranged to be charged with fluid under pressure from said pipe upon supply of fluid under pressure to said pipe and from which fluid under pressure is adapted to be released by way of said pipe upon release of fluid under pressure from said pipe, a choke in said communication arranged to restrict the release of fluid under pressure from said chamber to said pipe, said means being operative by a certain chosen degree of fluid pressure in said chamber to render said interlock means effective, and means operative to render said interlock means ineffective when the pressure of fluid in said chamber is less than said chosen degree.

31. A system for controlling the speed or power output of a prime mover and the operation of a clutch to connect and disconnect said prime mover to and from a member to be driven, comprising in combination, a power motor adjustable by fluid pressure to vary the speed of said prime mover in proportion to the pressure of such fluid, a pipe for supplying fluid under pressure to and releasing fluid under pressure from said motor, a clutch control motor comprising movable abutment means for controlling said clutch and having a neutral position for effecting disengagement of said clutch and being movable in one direction from neutral position to a second position to effect engagement of said clutch and in the opposite direction from neutral position to a third position to also effect engagement of said clutch, a control device comprising a lever having a neutral position and at one side thereof a second position and at the opposite side a third position corresponding to the positions of said movable abutment, means operable upon movement of said lever to any one of its positions for effecting movement of said movable abutment to the corresponding position, said lever having beyond said second position a speed control zone and beyond said third position another speed control zone, valve means for controlling the pressure of fluid in said pipe, said lever being operative upon movement into either of said zones to effect operation of said valve means to supply fluid to said pipe at a pressure proportional to the extent of movement away from the adjacent one of said second or third positions and being operative in said neutral position and in said second and third positions to effect operation of said valve means to open said pipe to atmosphere, a stop member in said control device arranged to be moved into and out of the path of movement of said lever between said second and third positions and being operable when in said path of movement to prevent movement of said lever from said second position to said third position or from said third position to said second position but providing for movement from either said second or third position to said neutral position, a movable abutment connected to said stop member and operable upon a certain increase in pressure in a chamber to move said stop member into the path of movement of said lever, a spring connected to said stop member and operative upon a reduction in pressure in said chamber to a certain low degree to move said stop member out of the path of movement of said lever, said chamber being open to said pipe providing for charging thereof with said lever in either of its speed control zones and the venting of fluid therefrom by way of said pipe upon movement of said lever out of said zones, means for restricting the flow of fluid under pressure from said chamber to said pipe to thereby maintain said stop member in the path of movement of said lever for a time interval after movement of said lever from either of said zones to the adjacent one of said second or third positions, and a valve device controlling communication through said pipe between said control device and fluid motor and controlled by said movable abutment means and operable to open such communication with said abutment means in either its second or third position and to close such communication and open said fluid motor to the atmosphere with said abutment means out of said second or third position.

32. In combination, an operator's control lever having a neutral position and a control position at each of the opposite sides of neutral position, a member effective to prevent movement of said lever from one control position to the other but to permit movement from either control position to said neutral position, a movable abutment movable to one position by fluid under pressure, means operable to move said abutment to another position upon release of such fluid under pressure, means operable to provide fluid under pressure on said abutment and to release fluid under pressure from said abutment, and means operable upon movement of said abutment to one of its positions to render said member effective and upon movement of said abutment to its other position to render said member ineffective.

ELLIS E. HEWITT